United States Patent Office 2,710,627
Patented June 14, 1955

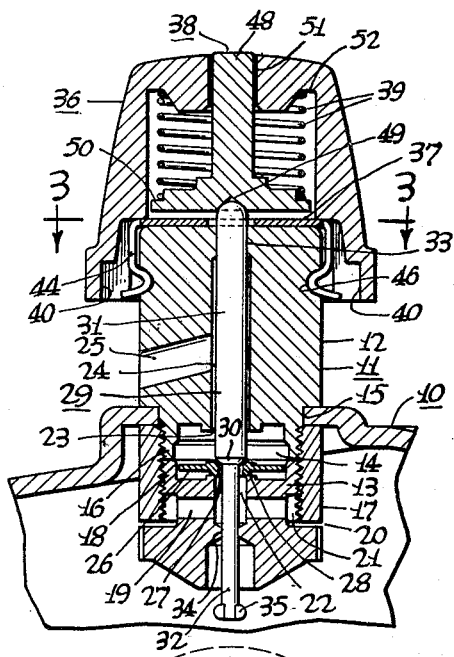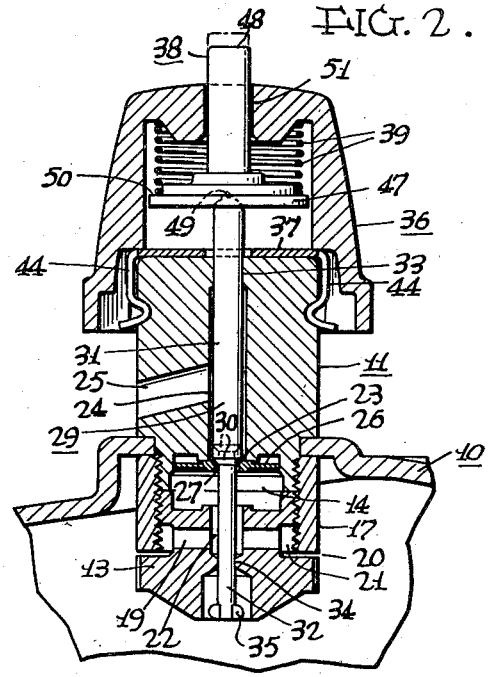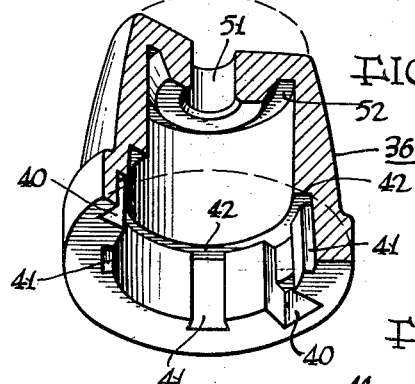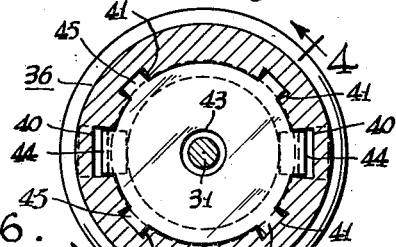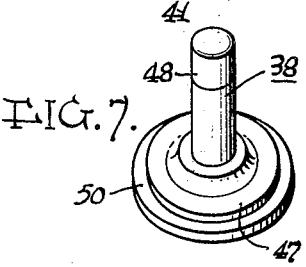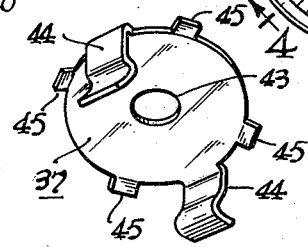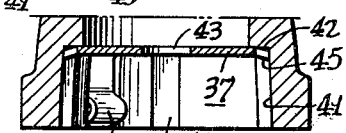

2,710,627

APPARATUS FOR CONTROLLING A PRESSURE COOKER

Robert J. Wagner, Philadelphia, and Harvey E. Hortman, Jr., Southampton, Pa., assignors to Proctor Electric Company, Philadelphia, Pa., a corporation of Pennsylvania Application June 12, 1951, Serial No. 231,225

2 Claims. (Cl. 137—540)

This invention relates to apparatus for controlling the pressure of a pressure source, and more particularly the invention relates to apparatus for controlling a pressure cooker.

In the copending Turner et al. application Serial No. 777,496, filed October 2, 1947, now Patent No. 2,641,680, issued June 9, 1953, there is disclosed and claimed an automatic pressure cooker apparatus comprising a control mechanism and a pressure cooking vessel adapted to be brought into cooperative relation with one another, the pressure cooking vessel being equipped with a valve having a freely movable valve element projectable by pressure within said vessel, and the control mechanism including a spring-biased element engageable by said valve element. Through the inter-engagement of the said elements, the operation of the pressure cooker is caused to be fully automatic under control of the said mechanism, requiring merely that the user set a control knob or dial to a selected setting for a desired cooking time.

In our copending application Serial No. 231,224, filed June 12, 1951, there is disclosed and claimed an improved and commercial embodiment of the Turner et al. apparatus.

In such an apparatus, it is desirable that the pressure cooker be usable non-automatically, i. e. apart from the automatic controlling mechanism, on an ordinary gas or electric range or other commonly used heating device for cooking purposes, such as an electric hot plate. In such use of the pressure cooker, it is necessary that the user reduce the heat input when the pressure within the cooker reaches the desired cooking pressure, and it is also necessary that the user commence timing the cooking operation when the cooking pressure is reached. However, the valve employed on the pressure cooker of the above-mentioned apparatus is not in itself adapted for non-automatic use of the pressure cooker.

The principal object of the present invention is to provide a device which will enable non-automatic operation of the pressure cooker of the above apparatus, not only extending the usage of such apparatus but also making it possible for a prospective user to first buy the pressure cooker itself and use it non-automatically, and later buy the control stand containing the control mechanism whenever it is convenient to do so.

Another object of this invention is to provide a novel valve adapter by which the pressure cooker of the above-mentioned apparatus may be used non-automatically apart from the control mechanism.

Still another object of this invention is to provide a novel valve adapter which will control the operation of the valve so as to cause pressure build-up within the pressure cooker to a desired cooking pressure, and which will give an indication to the user when the cooking pressure is reached.

A further object of the invention is to provide a novel combination of a valve and a pressure-controlling cap structure, which combination will perform the above-mentioned functions and will also vent any excess pressure in the event that the pressure within the cooker vessel rises above the cooking pressure.

Other objects and features of the invention will be apparent from the following detailed description with reference to the accompanying drawing, wherein:

Fig. 1 is a cross sectional view of the pressure cooker valve and the adapter provided by this invention, showing the movable parts in positions they assume prior to pressure build-up within the cooker vessel;

Fig. 2 is a similar view showing the movable parts in the positions to which they move upon attainment of the cooking pressure within the cooker vessel;

Fig. 3 is a sectional view taken along line 3—3 of Fig. 1;

Fig. 4 is a fragmentary sectional view taken along line 4—4 of Fig. 3;

Fig. 5 is a perspective sectional view of the cap employed in the cap structure;

Fig. 6 is a perspective view of the closure member employed in conjunction with the cap; and Fig. 7 is a perspective view of the movable member employed in the cap structure.

Referring first to Figs. 1 and 2, there is shown a portion of the lid 10 of a pressure cooker equipped with a valve 11 of the character employed in the apparatus hereinbefore mentioned. In the illustrated form of the valve, the valve casing comprises parts 12 and 13 which cooperatively form a chamber 14. Part 12 is formed to seat in an opening 15 of the pressure cooker lid 10 and has a threaded annular extension 16 which is threadedly engaged by a collar 17, the latter serving to hold the part 12 in place. Part 13 is also threadedly engaged with the collar 17 and has an upwardly-extending annular projection 18, which abuts with the annular extension 16 of the upper part 12.

Part 13 is provided with transverse passages 19, and it is formed so as to provide restricted annular passage spaces 20 and 21 between it and the lower part of collar 17, said spaces leading to the passages 19. The upper portion of part 13 is also formed to provide an inlet port 22 for the valve chamber 14, so that said chamber is in communication with the interior of the cooker vessel.

Part 12 is formed to provide an outlet port 23 for chamber 14 and also to provide a passage 24 leading from the outlet port to an outlet opening 25.

Within the valve chamber 14 is a pressure plate 26 which is freely movable vertically in said chamber. This plate is preferably in the form of a disk of smaller diameter than the internal diameter of chamber 14, and the plate has a central aperture 27 and a surrounding port-engaging portion 28. Extending through the aperture 27 of the plate is an axially movable stem 29 having a shoulder 30 which engages the upper edge of the aperture 27 so as to normally close said aperture. The upper section 31 of the valve stem, although larger in diameter than the lower section 32, is of smaller diameter than the outlet passage 24 and extends through a restricted opening 33 in part 12 exteriorly of the valve structure. The lower section 32 of the valve stem extends through a restricted aperture 34 of part 13. Thus, the valve stem is supported and guided for vertical axial movement. The lower end of the stem is swaged as shown at 35, thus providing an extreme upward limit of movement of the stem.

A valve of the character illustrated and above described, while usable in conjunction with apparatus such as hereinbefore mentioned for automatic control of a pressure cooker, is not in itself adapted for non-automatic operation of the pressure cooker. The obvious reason for this is that the movable valve parts are unrestrained as to upward movement, except by the slight force of gravity, and if it were attempted to use the valve by itself in non-automatic operation of the pressure cooker, the movable valve parts would rise under the influence of relatively low pressure within the cooker vessel, but would not be restrained in the manner necessary to effect a pressure seal, and therefore the pressure could not rise to the cooking pressure which is usually in the neighborhood of fifteen pounds.

In accordance with the present invention, there is provided an adapter in the form of a cap structure which is removably applicable to the valve and which serves to render the valve usable for non-automatic operation of the pressure cooker.

Referring further to the drawing, in the preferred form illustrated, the adapter comprises a cap 36 which may be formed of a material such as Bakelite having low heat conductivity, a closure member 37 for the mouth end of the cap which may be formed of thin sheet metal, a pressure-actuated member 38 which may be formed of a material such as Bakelite having low heat conductivity, and a helical spring 39 formed of wire of appropriate size and design to give a desired pressure when compressed, as hereinafter described. As may be seen in Figs. 3 and 5, the mouth portion of the cap 36 is formed to provide a pair of diametrically opposed internal recesses 40 and a number of other smaller internal recesses 41, all of the recesses extending inwardly from the mouth end of the cap and terminating at an internal shoulder 42. The closure member 37 is in the form of a thin sheet metal disk having a central aperture 43, a pair of diametrically opposed spring fingers 44, and a number of tabs 45 corresponding in number and position to the recesses 41 of the cap 36. The disk-shaped member 37 is of such size that it may be inserted within the mouth portion of the cap 36 to seat against the shoulder 42, with the spring fingers 44 disposed in recesses 40, and with the tabs 45 disposed in recesses 41. The tabs 45 are of such length that they frictionally engage the walls of recesses 41 and serve to lock member 37 in place.

Prior to the insertion of the closure member 37, however, the helical spring 39 and the pressure-actuated member 38 are inserted within the cap 36, as shown in Figs. 1 and 2. Then when the closure member 37 is inserted, the entire assembly forms a unitary device which may be applied to the pressure cooker valve whenever it is desired to operate the pressure cooker non-automatically. As shown in Figs. 1 and 2, part 12 of the valve 11 is provided with an annular recess 46, and the spring fingers 44 are bent to form end portions which seat in said recess. The cap recesses 40, which accommodate the spring fingers 44, are sufficiently large to permit flexing movement of the spring fingers as the adapter device is applied to or removed from the valve 11.

The pressure-actuated member 38 comprises a disk-like portion 47 and a stem-like portion 48. The disk-like portion 47 has a central recess 49 to seat the end of the valve stem 31, and the said portion also has a peripheral flange 50 to seat the lower end of the helical spring 39. The cap 36 is provided with a central aperture 51 at its top, through which the stem-like portion 48 extends, and the cap is also formed to provide an annular recess 52 to seat the upper end of the spring 39.

Considering the operation of the device, normally the movable parts are in the positions shown in Fig. 1 and the helical spring 39 is sufficiently compressed to provide a predetermined opposing force to upward movement of the valve stem 29, preventing upward movement of the stem until the pressure within the cooker vessel attains a predetermined value. It will be noted that the inner edge portion of the plate 26 slightly overhangs the edge of the valve inlet port 22, and when the pressure within the cooker vessel rises to a predetermined value, preferably less than the full pressure for the cooking operation, the pressure on the over-hanging edge portion of the pressure plate 26 breaks the seal and moves the pressure plate and the valve stem upward sufficiently to uncover the port 22, whereupon the pressure is applied over the full area of plate 26 and both it and the valve stem are moved rapidly upward to the position shown in Fig. 2, thus sealing the outlet port 23. The upward projection of the valve stem causes the stem-like portion 48 of member 38 to be projected upwardly above cap 36, and this indicates to the user that it is time to reduce the heat input and to commence timing the cooking operation. Preferably member 38 is of a distinctive bright color, such as bright red, so as better to attract the attention of the user. At this time, the spring 39 is further compressed and exerts a predetermined downward pressure on the valve stem. The cooker pressure is applied to the shoulder 30 but the spring resists further movement of the valve stem 29 as long as the pressure does not exceed full cooking pressure. Accordingly, the pressure is permitted to rise to the full cooking pressure.

During the pressure cooking operation, if the pressure within the cooker vessel should rise above the desired cooking pressure, the valve stem 29 will rise, as indicated by the dotted line showing in Fig. 2, the spring 39 being ineffective to prevent the movement of the stem under the excess pressure exerted on the shoulder 30 through the aperture 27 of plate 26. The rising of the valve stem uncovers the said aperture and causes pressure venting through the passage 24 and outlet 25 until the pressure within the cooking vessel decreases substantially to the desired cooking pressure, at which time the valve stem is lowered by the force of spring 39 to close the aperture 27.

By the present invention, the user is apprised to start the timing of the cooking operation at a certain pressure, preferably less than the desired full cooking pressure. The early starting of the timing acts to compensate for any cooking that is done during the heating up operation. The user is also apprised that the heat should be reduced and can therefore prevent excessive steam loss due to overshoot. In the embodiment shown, member 38 will move to the position of Fig. 2 on attainment of approximately 8 p. s. i. cooker pressure. This is the value chosen for an operating cooking pressure of 15 p. s. i. Attainment of pressures in excess of 15 p. s. i. causes rising of valve stem 29 to thereby vent the steam through passage 24 and outlet 25. As with the usual non-automatic cooker, the user reduces the heat to a value sufficient to maintain a slight intermittent steam venting.

At the end of the timed cooking operation, the user removes the pressure cooker from the source of heat or turns the heat off, and the pressure within the cooker may be reduced by one of several procedures. The cooker may be cooled by running water thereon, or downward pressure may be manually applied to the stem-like portion 48 in an amount sufficient to move the plate 26 to an intermediate position in chamber 14, thus causing the pressure to be vented around said plate and through the valve ports. A preferred procedure is to manually remove the adapter from its position on top of valve 12. This permits the stem 29 to rise to its topmost position as determined by its swaged end 35. The stem vents through the annular orifice 24 and out opening 25. The rate of steam release through orifice 24 is determined by the area of the annulus. The orifice provided permits a rate of steam release far less than that of existing commercial devices. The danger of sudden pressure release that might result from large orifice areas is eliminated. Further, the danger of clogging is greatly reduced by the use of lower venting rate. In any case the design of the peripheral inlet opening 20 practically eliminates blocking or coverage by food particles, e. g., leaf-type vegetables. It will also be noted that the opening 25 is directed downward toward the vessel top and thus away from the user. The use of a low heat conductivity material for the cap 36 and the downward steam deflection provides an arrangement that is extremely safe and convenient for the user.

From the foregoing description, it will be seen that the invention provides a simple low cost adapter device which functions cooperatively with a valve having freely movable elements to control the pressure of a pressure cooker during non-automatic operation of the same. While a preferred embodiment of the invention has been illustrated and described, it is to be understood that the invention is not to be limited thereto but is capable of various modifications and other embodiments.

We claim:

1. Apparatus for controlling the pressure of a pressure source, comprising a valve including a casing adapted to be placed in communication with the pressure source and having a pressure outlet to relieve the pressure of said source, freely movable valve means in said casing including a valve element subject to the pressure of said source and extending externally of said casing, a cap having an opening and a mouth portion adapted to fit over the top of said valve, a closure member at the mouth portion of said cap secured to the latter and forming therewith a chamber, said closure member having an aperture to accommodate said movable valve element, spring fingers on said closure member for engagement with said valve to hold said cap thereon, a movable member within said chamber comprising a disk-like portion engageable by said movable valve element and a stem-like portion projectable through said opening, and a helical spring within said chamber engaging said cap and said disk-like portion to prevent movement of said movable member and said valve element until the pressure of said source reaches a predetermined value less than full operating pressure, the projection of said stem-like portion signaling the attainment of said pressure value, said spring resisting further movement of said valve element unless the pressure of said source rises above the full operating pressure, whereupon further movement of said element is permitted to vent the excess pressure.

2. Apparatus for controlling the pressure of a pressure source, comprising a valve including a casing adapted to be placed in communication with the pressure source and having a pressure outlet to relieve the pressure of said source, freely movable valve means in said casing including a valve element subject to the pressure of said source and extending externally of said casing, a cap having an internal shoulder and a plurality of angularly-spaced internal recesses extending from said shoulder to the open end of the cap, said cap also having an opening at the top thereof, a disk within said cap seated against said shoulder and having detent tabs extending into said recesses in frictional engagement with said cap, the assembled cap and disk being mountable on said valve, spring fingers on said disk engageable with said valve to hold said cap thereon, said cap and said disk forming a chamber, and said disk having an aperture to permit projection of said movable valve element into said chamber, a movable member within said chamber comprising a disk-like portion engageable by said movable valve element and a stem-like portion projectable through the top opening of said cap, and a helical spring within said chamber engaging said cap and said disk-like portion to prevent movement of said member and said valve element until the pressure of said source reaches a predetermined value less than full operating pressure, the projection of said portion signaling the attainment of said pressure value, said spring resisting further movement of said valve element unless the pressure of said source rises above the full operating pressure, whereupon further movement of said element is permitted to vent the excess pressure.

References Cited in the file of this patent

UNITED STATES PATENTS

| | | |
|---|---|---|
| 475,320 | Johnston | May 24, 1892 |
| 1,153,703 | Rosencrantz | Sept. 14, 1915 |
| 1,239,022 | McClean | Sept. 4, 1917 |
| 1,273,347 | Ferris | July 23, 1918 |
| 1,914,020 | Jardine | June 13, 1933 |
| 2,200,903 | Stephens | May 14, 1940 |
| 2,241,137 | Jones | May 6, 1941 |
| 2,287,936 | Hose | June 30, 1942 |
| 2,294,746 | Grundstrom | Sept. 1, 1942 |
| 2,297,378 | Wittenberg | Sept. 29, 1942 |
| 2,349,137 | Brown | May 16, 1944 |
| 2,428,483 | Wittenberg | Oct. 7, 1947 |
| 2,524,996 | Seyers | Oct. 10, 1950 |
| 2,563,563 | Swenson | Aug. 7, 1951 |
| 2,570,655 | Druge | Oct. 9, 1951 |
| 2,574,151 | Laidley | Nov. 6, 1951 |
| 2,586,440 | Saltz | Feb. 19, 1952 |
| 2,628,738 | Hilldale | Feb. 17, 1953 |

FOREIGN PATENTS

| | | |
|---|---|---|
| 286,698 | Germany | 1915 |
| 515,231 | Great Britain | 1939 |